US011192599B2

(12) United States Patent
Hukkanen et al.

(10) Patent No.: US 11,192,599 B2
(45) Date of Patent: Dec. 7, 2021

(54) FOREST MACHINE

(71) Applicant: Ponsse Oyj, Vierma (FI)

(72) Inventors: Pentti Hukkanen, Vierema (FI); Kalle Einola, Vierema (FI)

(73) Assignee: Ponsse Oyj, Vieremä (FI)

( * ) Notice: Subject to any disclaimer, the term of this patent is extended or adjusted under 35 U.S.C. 154(b) by 221 days.

(21) Appl. No.: 16/619,258

(22) PCT Filed: Jun. 5, 2018

(86) PCT No.: PCT/FI2018/050421
§ 371 (c)(1),
(2) Date: Dec. 4, 2019

(87) PCT Pub. No.: WO2018/224733
PCT Pub. Date: Dec. 13, 2018

(65) Prior Publication Data
US 2020/0254918 A1    Aug. 13, 2020

(30) Foreign Application Priority Data
Jun. 5, 2017 (FI) ..................................... 20175514

(51) Int. Cl.
B62D 55/065    (2006.01)
B60P 3/41    (2006.01)
(52) U.S. Cl.
CPC .............. *B62D 55/065* (2013.01); *B60P 3/41* (2013.01)
(58) Field of Classification Search
CPC ...... B62D 55/0655; B62D 55/065; B60P 3/41
See application file for complete search history.

(56) References Cited

U.S. PATENT DOCUMENTS 3,443,654 A * 5/1969 Schoonover ........... B62D 55/04
180/9.62
3,696,878 A 10/1972 Nelson
(Continued)

FOREIGN PATENT DOCUMENTS

CN    201646913    11/2010
CN    106232464    12/2016
(Continued)

OTHER PUBLICATIONS

Finnish Search Report and office action related to priority Finnish application FI 20175514. dated Dec. 29, 2017. 8 pages).
(Continued)

*Primary Examiner* — Kevin Hurley
(74) *Attorney, Agent, or Firm* — Beem Patent Law Firm

(57) ABSTRACT

The invention relates to a forest machine, comprising a chassis having a first chassis and a second chassis pivoted consecutively by a central pivot, first sets of wheels arranged in connection with the first chassis, an engine fitted in connection with the first chassis, a load space supported on the second chassis extending at least partly below an upper surface of the second sets of wheels, power transmission transmitting power to the second drive wheel of the second sets of wheels, wherein the second chassis includes two longitudinal parts attached to each other at least in front of the load space, which longitudinal parts are at a distance from each other in lateral direction of the forest machine at least over a partial length of the load space, in which forest machine the load space extends between the longitudinal parts in vertical direction of the forest machine.

20 Claims, 13 Drawing Sheets

(56) References Cited

U.S. PATENT DOCUMENTS

| | | | |
|---|---|---|---|
| 3,744,857 A | 7/1973 | Schoonover | |
| 4,671,774 A | 6/1987 | Owsen | |
| 6,149,474 A | 11/2000 | Olkowski | |
| 2010/0104406 A1 | 4/2010 | Hulscher et al. | |
| 2012/0271521 A1 | 10/2012 | Nordberg | |
| 2021/0163085 A1* | 6/2021 | Jordan | B62D 55/10 |

FOREIGN PATENT DOCUMENTS

| | | |
|---|---|---|
| DE | 41 31 010 A1 | 3/1993 |
| DE | 10 2011 014 432 A1 | 11/2011 |
| EP | 1486405 B1 | 6/2008 |
| EP | 2962550 A1 | 1/2016 |
| FI | 112158 B | 9/2000 |
| FI | 127979 B | 6/2018 |
| FR | 2530213 | 7/1982 |
| GB | 2221662 A | 2/1990 |
| GB | 2435866 A | 9/2007 |
| SE | 304629 B | 9/1968 |
| SE | 522277 | 1/2004 |
| WO | 2009040472 A1 | 4/2009 |
| WO | 2015162341 A1 | 10/2015 |
| WO | 20182247733 A1 | 12/2018 |

OTHER PUBLICATIONS

International Search Report from PCT/FI2018/050421. dated Sep. 13, 2018. (4 pages).
Extended European Search Report for priority application PCT/FI2018/050421. 7 pages.

* cited by examiner

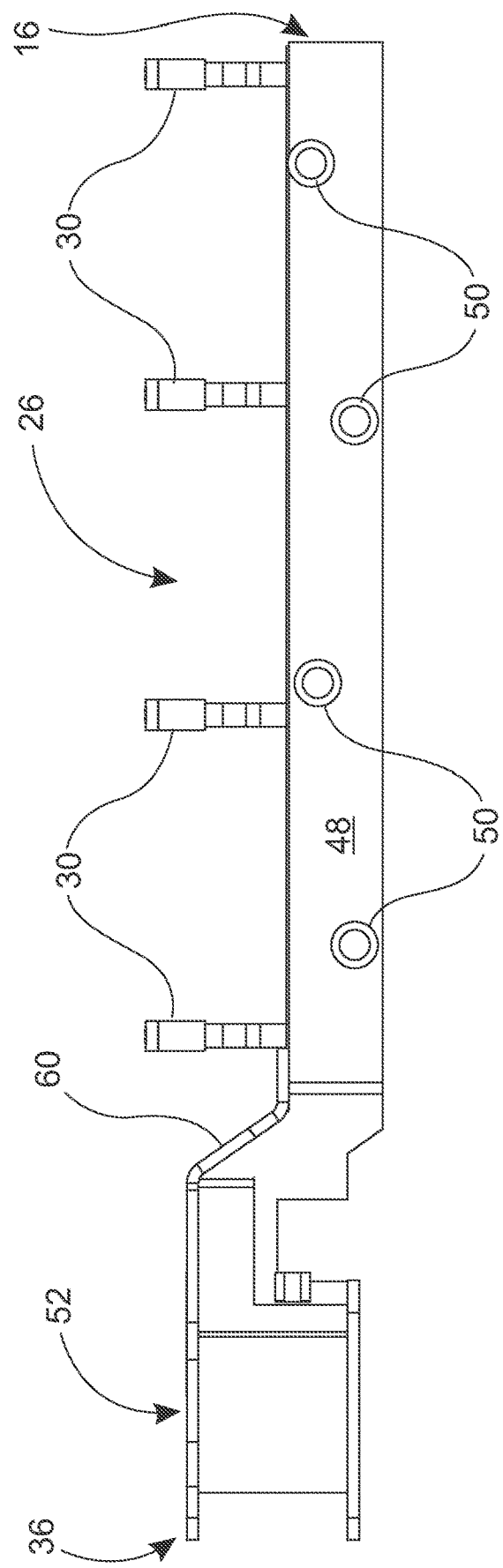

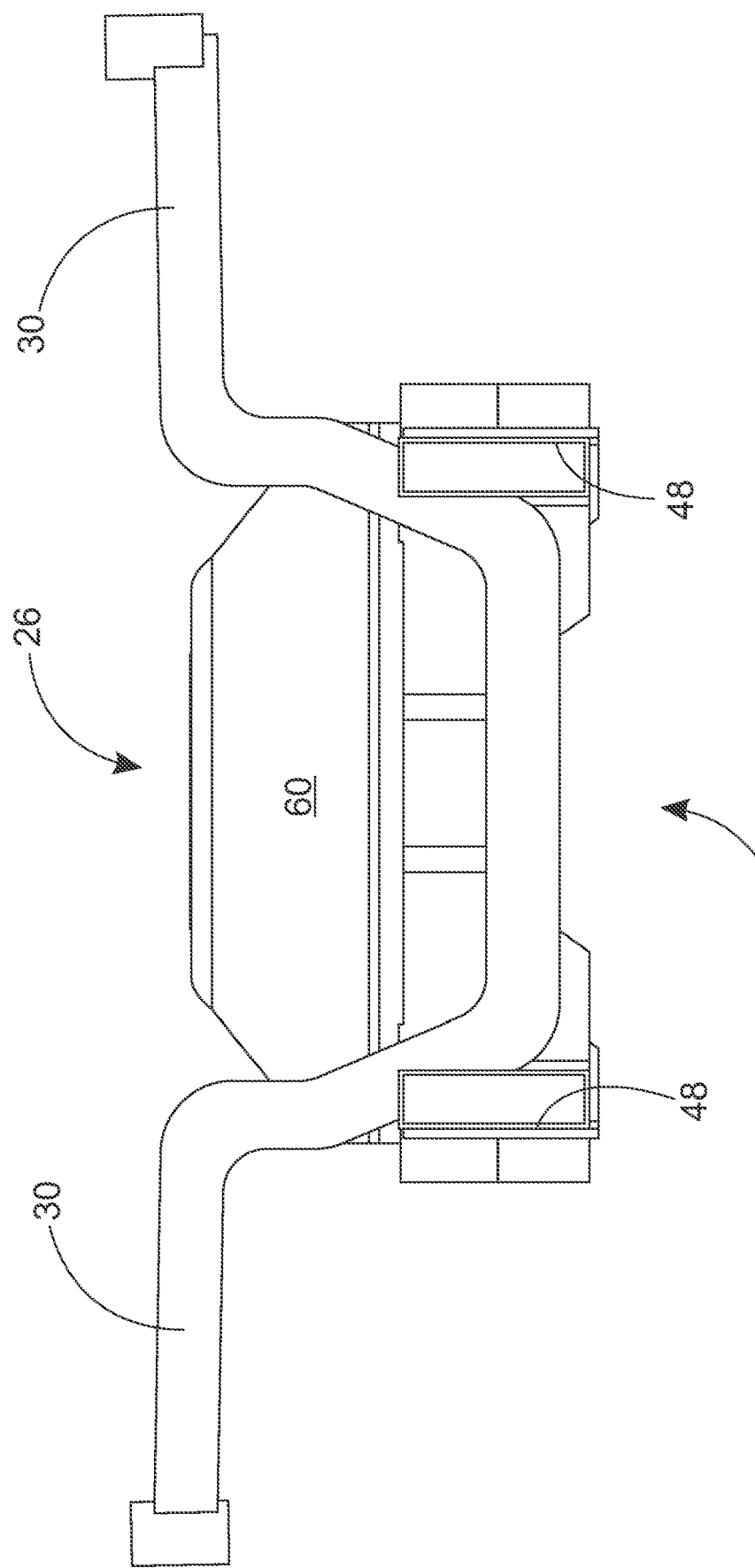

FOREST MACHINE

CROSS-REFERENCE TO RELATED APPLICATIONS

This application claims benefit of PCT/FI2018/050421 filed Jun. 5, 2018, which claims benefit of Finnish Patent Application No. FI 20175514, filed Jun. 5, 2017, each of which is incorporated by reference in its entirety.

FIELD OF THE INVENTION

The invention relates to a forest machine comprising a chassis having a first chassis and a second chassis pivoted consecutively by a central pivot, first sets of wheels arranged in connection with the first chassis on both sides of the first chassis supporting the first chassis of the forest machine on ground, each first set of wheels including at least two wheels at a distance from each other in longitudinal direction of the first chassis, and at least one wheel of the at least two wheels of the first set of wheels is a first drive wheel, second sets of wheels arranged in connection with the second chassis on both sides of the second chassis supporting the second chassis of the forest machine on ground, each second set of wheels including at least two wheels at a distance from each other in longitudinal direction of the second chassis, and at least one wheel of the at least two wheels of the second set of wheels is a second drive wheel installed in the second chassis, an engine creating drive power, fitted in connection with the first chassis, a load space for transporting a load, supported on the second chassis and extending at least mainly on top of the second chassis and at least partly on top of the second sets of wheels in an operating position of the forest machine, which load space extends at least partly below an upper surface of the second sets of wheels between the second sets of wheels lowering centre of gravity of the forest machine, power transmission transmitting power from the engine to the second sets of wheels of the second chassis, comprising a first power transmission part located in the first chassis and a second power transmission part arranged in the second chassis, in which the first power transmission part transmits power to the second power transmission part, which further transmits power to the second sets of wheels, wherein the second chassis includes two longitudinal parts attached to each other, which longitudinal parts are at a distance from each other in lateral direction of the forest machine at least over a partial length of the load space, in which forest machine the load space extends between the longitudinal parts in vertical direction of the forest machine.

BACKGROUND

The applicant's own publication WO 2015/162341 A1 is known from the prior art, in which a chassis-steered forest machine 10 according to FIG. 1 is shown, which includes crawler-track units 28 for supporting the forest machine 10 on the ground. The forest machine's 10 chassis 12 is in two parts, comprising a first chassis 14 and a second chassis 16, in connection with, and on each side of which a set of wheels 18 is arranged, i.e. in this case a single crawler-track unit 28. The sets of wheels in the first chassis are namely first sets of wheels and the sets of wheels in the second chassis are namely second sets of wheels. The forest machine's cab 40 and engine 22 are situated on the first chassis 14, while the load space 26 is on the second chassis 16. The load space 26 extends in the lateral direction of the forest machine 10 on top of the crawler-track unit 28, to increase the capacity of the load space 26. Power is transmitted from the engine 22 with the aid of the power transmission 24 inside the forest machine's 10 first chassis 14 and second chassis 16 laterally from the centre of the forest machine's 10 second chassis 16 to the crawler-track units 28. The power transmission in the first chassis is namely a first power transmission part and the power transmission in the second chassis is namely a second power transmission part. Each crawler-track unit 28 is supported on the chassis 12 with the aid of swing bogies 66, which permits the crawler-track units 28 to swing according to the ground, around a swing bearing 68 between the swing bogie 66 and the chassis 12. In this forest machine, swing-bogie wheels can also be used instead of the crawler-track units, and are pivoted to the forest machine's first and second chassis with the aid of the same swing bearings.

The work machines used in mechanical timber harvesting unavoidably cause a certain loading on the forest floor, the ground, and in thinning sites also on the roots of the trees left to grow. The problem is typically less in the case of a harvester, which does not need to carry a load in addition to its own weight, as in the case of the forwarder according to FIG. 1. In other words, there is usually a significant difference in the surface pressure imposed on the ground by the said forest machines. Attempts have been made to reduce the surface pressure imposed on the ground by the said machines through various known solutions by increasing the area of contact between the ground and the forest machine. Because the width of forest machines is limited by the provisions of the Road Traffic Act in the case of their road transfers, it has been sought to increase the area of contact by using longer crawler-track units. In addition, narrowness is advantageous to a forest machine also in thinning felling, in which there are narrow logging roads.

In the case of the prior art publication WO 2015/162341 A1, the use of a longer crawler-track unit 28 leads, however, to its vertical path of motion increasing when the crawler-track unit 28 swings. Thus, in the second chassis 16 according to FIG. 1, the load space 26 on top of the crawler-track unit 28 must be placed higher at a greater distance from the ground, so that the crawler-track unit 28 will not strike the load space 26 when swinging. Placing the load space higher raises, in turn, the centre of gravity of the load. The higher centre of gravity makes the behaviour of the forest machine more unstable in the lateral direction of the forest machine and at the same time causes loads to move more heavily onto only one side of the crawler-track unit. For its part, this puts a great strain on the swing bearing supporting the crawler-track unit, which exposes the swing bearing to damage. If it is wished to increase the length of the crawler-track unit, the structure of the unit should be reinforced considerably in the case of the swing element and the structures of the crawler-track unit, so that the crawler-track unit would be sufficiently durable. In turn, this increases the manufacturing costs and weight of the crawler-track unit.

SUMMARY

The invention is intended to create a more durable and stable forest machine than forest machines of the prior art, which also has a low surface pressure on the ground. The present invention is characterized by a forest machine, comprising a chassis having a first chassis and a second chassis pivoted consecutively by a central pivot, first sets of wheels arranged in connection with the first chassis on both sides of the first chassis supporting the first chassis of the forest machine on ground, each first set of wheels including at least two wheels at a distance from each other in longitudinal direction of the first chassis, and at least one wheel of the at least two wheels of the first set of wheels is a first drive wheel and second sets of wheels arranged in connection with the second chassis on both sides of the second chassis supporting the second chassis of the forest machine on ground, each second set of wheels including at least two wheels at a distance from each other in longitudinal direction of the second chassis, and at least one wheel of the at least two wheels of the second set of wheels is a second drive wheel installed in the second chassis in a fixed position relative to longitudinal length of the second chassis. In addition, the forest machine includes an engine creating drive power, fitted in connection with the first chassis, a load space for transporting a load, supported on the second chassis and extending at least mainly on top of the second chassis and at least partly on top of the second sets of wheels in an operating position of the forest machine, which load space extends at least partly below an upper surface of the second sets of wheels between the second sets of wheels lowering centre of gravity of the forest machine and power transmission transmitting power from the engine to the second sets of wheels of the second chassis, comprising a first power transmission part located in the first chassis and a second power transmission part arranged in the second chassis in front of the load space in direction of travel of the forest machine, between the central pivot and the load space, in which the first power transmission part transmits power to the second power transmission part, which further transmits power to the second drive wheel of the second sets of wheels. The second chassis includes two longitudinal parts attached to each other at least in front of the load space, which longitudinal parts are at a distance from each other in lateral direction of the forest machine at least over a partial length of the load space, in which forest machine the load space extends between the longitudinal parts in vertical direction of the forest machine.

In the forest machine according to the invention, the second sets of wheels attached rigidly, without a swing mechanism, to the second chassis of the forest machine permit the use of a longer structure of a second set of wheels, as well as the arrangement of the load space lower close to the upper surface of the second sets of wheels, as the second sets of wheels attached rigidly to the second chassis do not require space in the vertical direction, as swinging sets of wheels do. On the other hand, arranging the second power transmission part in front of the load space permits the second chassis to be divided into two parts, in which the longitudinal parts of the second chassis are at a distance from each other in the longitudinal direction of the forest machine, thus permitting the load space to extend between the longitudinal parts. The rigid attachment of at least the second drive wheel of each second set of wheels to the second chassis allows the use of longer second sets of wheels, as the loading is distributed evenly to the bearings of all the wheels of the second set of wheels, instead of to the swing bearing of the swing element according to the prior art. The load space, which is arranged to be lower, lowers the location of the centre of gravity of the load, which in turn reduces the stresses acting of the suspensions of the second sets of wheels during lateral tilting of the forest machine and substantially improves the stability of the forest machine. In addition, the load space which is arranged to be lower also even the distribution of the loadings to different sides of the forest machine when it crosses obstacles. Power transmission to the rigid second set of wheels can be implement in front of the load space, so that it does not require space beneath the load space, so that the undersurface of the load space can be implemented beneath the upper surface of the second set of wheels, between the second sets of wheels and the longitudinal parts of the second chassis. The implementation of the fixed second set of wheels can be made to form a quite simple and robust structure, which withstands the stresses caused by the unevenness of a forest better than the swing bogies with bearings of the prior art.

According to one embodiment, the second drive wheel is supported directly on a longitudinal part of the second chassis with the aid of a rigid axle before the load space of the second chassis. The support of the second drive wheel is then extremely reliable and the bottom of the load space can be constructed to be lower, as there are no power-transmission components under the load space.

In this context, the term second set of wheels always refers to all the wheels on each side of the second chassis, which together form the set second of wheels, which includes at least one second drive wheel. In this context the term second drive wheel refers to a wheel, the rotation axle of which is rotated with the aid of power created by the engine.

In this context, the term first set of wheels always refers to all the wheels on each side of the first chassis, which together form the set first of wheels which includes at least one first drive wheel. In this context the term first drive wheel refers to a wheel, the rotation axle of which is rotated with the aid of power created by the engine.

In other words, in the forest machine according to the invention the load space extends beneath the upper surface of the longitudinal parts of the second chassis.

By distributing power from in front of the load space to the second set of wheels, the underside of the load space remains free, permitting the load space to be made lower in the second chassis. Implemented in this way, in the forest machine according to the invention power is transmitted from in front of the load space to the second drive wheels, and through that possibly then to a crawler track, if the second set of wheels is part of a crawler-track unit.

Preferably the first sets of wheels and the second sets of wheels are each part of a crawler-track unit. The use of crawler-track units permits a low surface pressure on the ground. The forest machine preferably also includes a crawler-track fitted around the first set of wheels and the second set of wheels. In that case, the each set of wheels includes, as wheels, a drive wheel, an idler, and resilient wheels, which are located in the part of the crawler track acting against the surface of the ground, thus permitting the rigid crawler-track unit to conform to the shapes of the surface of the ground.

Preferably the said resilient wheels are arranged to be mounted in bearings or supported in the forest machine's second chassis with the aid of separate swing elements, torsion springs, or leaf springs. These swing elements permit the under surface of the crawler-track unit to conform to the ground. These swing elements transmit only a part of the force, unlike the swing bogie of the prior art, which is intended to support the entire crawler-track unit.

Preferably the first drive wheel, idler, and resilient wheels of the first set of wheels belonging to each crawler-track unit of the first chassis are arranged in such a way that the first drive wheel and idler achieve an angle of coverage of at least 150° relative to the crawler track and the second drive wheel, idler, and resilient wheels of the second set of wheels belonging to each crawler-track unit of the second chassis are arranged in such a way that the second drive wheel and idler achieve an angle of coverage of at least 150° relative to the crawler track. Thus power is transmitted effectively from each drive wheel to the crawler track and on the other hand the angle of contact of the crawler-track unit to the ground remains small. The term angle of contact refers to the angle between the crawler track and the ground in the driving direction, at which angle the crawler-track unit meets the unevenness in the ground.

Alternatively, the first sets of wheels and the second sets of wheels are each part of a set of pneumatic wheels. Also in the case of sets of pneumatic wheels a problem has been the need for space in the vertical direction of sets of pneumatic wheels pivoted with the aid of swing bogies according to the prior art, which has forced the load space of a forest machine to be relatively far in the vertical direction from the surface of a set of pneumatic wheels, thus making the centre of gravity of the load quite high. In the case of the present rigidly suspended second sets of wheels the load space can located lower than in the solutions of the prior art.

Preferably the wheels of the sets of pneumatic wheels have pneumatic tyres in order to reduce the surface pressure of the forest machine.

All the wheels of the sets of pneumatic wheels can be drive wheels. The drive can be arranged from the drive wheels to the other wheels, for example, with the aid a chain or separately to some of the wheels with the aid of an electric or hydraulic motor.

Preferably in the sets of pneumatic wheels each wheel is mounted in bearings directly in the longitudinal part of the second chassis.

Preferably the second chassis forms part of the second set of wheels, in which the wheels are mounted directly. The two-part second chassis is divided on each side of the load space located between it, so that it can also be used in the suspension of the second sets of wheels without a separate crawler-track or bogie frame.

Preferably the longitudinal parts of the second chassis are two longitudinal frame beams arranged at a distance from each other in the transverse direction of the forest machine and supported on each other at least from in front of the load space. A second chassis implemented with the aid of frame beams is simple to manufacture.

Alternatively the second chassis is formed by casting and includes the said longitudinal parts as parts integrated in the cast piece, which are joined together at least from in front of the load space with the aid of the casting. The second chassis can then be implemented either without welded seams, or else with a small number of welded seams.

The second chassis preferably includes a splitter comprising a central pivot for pivoting the second chassis to the first chassis, two longitudinal parts of the second chassis at a distance from each other in the transverse direction of the forest machine, and an intermediate piece for attaching the longitudinal parts to each other and to the splitter. With the aid of such a chassis the second power transmission part can be implemented before the second chassis load space in the longitudinal direction of the forest machine and the load space can be dropped between the sets of wheels below the upper surface of the sets of wheels.

The load space preferably includes at least two bunks, which bunks are permanently attached to the second chassis and form the load space between the second sets of wheels of the second chassis. When using the bunks, they can form part of the load-bearing structure of the second chassis.

According to one embodiment, the second power transmission part includes a rigid axle of the second chassis for supporting each second drive wheel of the second set of wheels and for transmitting drive directly to each wheel of the second set of wheels of the second chassis. A rigid axle is simple and durable in construction and economical to implement. In addition, this totality is easily and commercially available as a single component.

According to another embodiment, the first power transmission part includes one hub motor in each first set of wheels for creating drive in at least one wheel and the second power transmission part includes one hub motor in each second set of wheels for creating drive in at least one wheel. Power transmission implemented with the aid of hub motors is easy to implement through the pivot between the forest machine's consecutively pivoted first and second chassis, as the hydraulic or electrical operating power can be easily transmitted to the hub motor without mechanical power transmission.

According to a third embodiment, the first power transmission part is implemented with the aid of a mechanical first cardan shaft and the second power transmission part is implemented with the aid of a mechanical second cardan shaft. Power transmission implemented with the aid of cardan shafts are very well known from the prior art and there are many component suppliers.

In the first chassis, power can be transmitted to the first set of wheels with the aid of the first power transmission part of the first chassis according to the prior art.

The first chassis and the second chassis can be pivoted together with the aid of a central pivot, which central pivot comprises at least one degree of freedom permitting the chassis to rotate mutually. The use of two pivots in different direction and a rotating joint in the central pivot permits additional degrees of freedom to the movement between the first chassis and the second chassis, thus reducing the stresses acting on the central pivot, which are caused by the mutually deviating movements of the first chassis and the second chassis according to unevenness in the ground. More specifically, the horizontal pivot is preferably in the transverse direction of the forest machine.

The load space can extend between the sets of wheels in the vertical direction of the sets of wheels to a distance of 30-60% of the height of the sets of wheels. The centre of gravity of the load then moves tens of centimeters, even as much as over one metre closer to the support point between the forest machine and the ground. This in turn reduces the lateral movement of the centre of gravity away from the centre line of the forest machine when the forest machine tilts laterally, so that the forest machine's weight is distributed more evenly between the sets of wheels of the second chassis, thus reducing the surface pressure acting on the ground and the stresses acting on the support of the sets of wheels.

The drive wheel of the wheels of the sets of wheels of the second chassis is preferably the first in the direction of travel of the forest machine. Thus power is transmitted to the drive wheel before the load space without arranging the second power transmission part underneath the load space, as, for example, in publication WO 2013/178882 of the prior art.

The part of the load space extending above the sets of wheels can be at a distance of 15-40 cm from the upper surface of the sets of wheels. In constructions equipped with swing bogies according to the prior art, the distance is as much as 50-100 cm, in order to permit the swing element sufficient tilting without striking the load space.

In the longitudinal direction of the forest machine, the length of the second set of wheels is preferably 1.0-4.5 m, preferably 1.2-2.5 m, measured in the longitudinal direction of the second set of wheels over the distance between the first and last wheel hubs. In such a long second set of wheels, the loadings acting of the swing bogies according to the prior art will become too great, so that it is advantageous to use the rigid suspension of the second set of wheels according to the invention.

The height of the load space to be used in the forest machine can be 1.5-3.0 m, preferably 2.0-2.5 m. Especially in the load spaces in connection with such a forest machine the centre of gravity of the load is easily quite high, emphasizing the transfer of the loading from one set of wheels to the other when the forest machine tilts according to unevenness in the ground.

Preferably the length of the said load space is at least 80% of the length of the second chassis of the forest machine. The load space will then be suitable for transporting logs.

Though the invention will be described by way of a forest machine with a two-part chassis, it should be understood that, in the forest machine according to the invention, there can also be three or more chassis pivoted consecutively, in each one of which chassis equipped with a load space the lowered load space and rigid second set of wheels solution according to the invention can be used. Preferably the consecutive chassis are pivoted to each other by a pivot with at least one degree of freedom. In principle, the front part formed around the first chassis of the forest machine can be relatively freely selected, the central pivot forming a modular interface between the front part and the rear part.

The load space is preferably open on top, to permit the loading of trees.

The power transmission preferably includes a pivot component fitted between the first chassis power transmission and the second chassis power transmission, which is arranged for transmitting power through the central pivot from the first chassis to the second chassis. This permits the transmission of power from the engine in the first chassis to the drive wheel of each second set of wheels in the second chassis.

According to one embodiment, the first power transmission part includes a first cardan shaft for transmitting power in the first chassis and the second power transmission part includes a second cardan shaft in the second chassis and a cardan central pivot fitted in the central pivot between second cardan shaft and the first cardan shaft, which acts as the said pivot component. With the aid of the cardan shafts, the power transmission can be implemented using generally available components.

The second cardan shaft is preferably arranged to transmit power to the splitter and is 0.5-1.5-m long. The second cardan shaft thus does not take up space beneath the load space and distributes power from in front of the load space in the second chassis.

According to one embodiment, at least two of the wheels of a set wheels, which are freely rotating, are supported to swing on the second chassis with the aid of separate bogie frames. Thus, despite the drive wheel of the second set of wheels attached rigidly to the longitudinal part of the second chassis, the second set of wheels conforms well to the shapes of the ground, without, however, affecting the uppermost point of the second set of wheels and consequently the location of the load space.

The bogie frame can be curved in shape. With the aid of a curved bogie frame the wheels can be kept lower than the upper surface of the set of wheels, thus permitting the load space to extend lower down also on top of the sets of wheels.

The bunks preferably also form the bottom of the load space. The load space is then quick to manufacture.

The first set of wheels and the second set of wheels each preferably includes a frame and the longitudinal parts of the second chassis are arranged to form the frame of the sets of wheels, to which at least some of the wheels are mounted in bearings. This permits the sets of wheels to be implemented using fewer components.

Preferably in each second set of wheels the second drive wheel is first in the direction of movement of the forest machine, so that power is transmitted to the second drive wheel before the load space, when seen relative to the longitudinal direction of the forest machine.

In terms of the location of the wheels, each set of wheels in both first sets of wheels and second sets of wheels is preferably symmetrical in both drive directions. Thus, good ground properties are achieved with the forest machine. For example, when using a crawler track the drive wheel and the corresponding idler are located at the ends of the set of wheels and the other wheels act as support wheels symmetrically between them.

The forest machine preferably includes a lifting booms attached on top of the splitter. The splitter forms a sturdy base for the lifting boom, which is used to lift trees into the load space.

According to one embodiment, the second chassis includes two bogie frames for each second set of wheels. Thus the undersurface of the set of crawler-track wheels effectively conforms to the shapes of the ground, in order to lower the surface pressure of the forest machine.

Each second set of wheels preferably also includes an idler and at least one support wheel, both of which are installed in the second chassis in a fixed position relative to the longitudinal direction of the second chassis. Thus, in each second set of wheels, there can be an upper surface in a fixed position relative to the rotation of the crawler track, when the load space can be constructed to extend close to the upper surface of the crawler track.

The swing bogie can be arranged to rotate with a range of motion of at most 90°. The movement of the swing bogie does not then change the location of the crawler track and consequently of the upper surface of the set of crawler-track wheels.

The mass of a forest machine according to the invention, when loaded can be 15-50 t, so that achieving a low surface pressure is particularly challenging.

BRIEF DESCRIPTION OF THE DRAWINGS

In the following, the invention is described in detail with reference to the accompanying drawings showing some embodiment of the invention, in which:

FIG. 4 shows a side view of the separated second chassis of the forest machine according to the invention, FIG. 5 shows a rear view of the separate second chassis of the forest machine according to the invention.

DETAILED DESCRIPTION OF THE INVENTION

In the detailed description, the term "set of wheels" is used to refer to both first sets of wheels and the second sets of wheels and reference to first sets of wheels is made by referring to "set of wheels of the first chassis" and reference to second sets of wheels is made by referring to "set of wheels of the second chassis". In addition, in the detailed description, the term "power transmission" is used to refer to both first power transmission part and the second power transmission part and reference to first power transmission part is made by referring to "power transmission of the first chassis" and reference to second power transmission part is made by referring to "power transmission of the of the second chassis". The term "drive wheel" is used to refer to both first drive wheel and the second drive wheel and reference to first drive wheel is made by referring to "drive wheel of the first chassis" and reference to second drive wheel is made by referring to "drive wheel of the of the second chassis". The term "cardan shaft" is used to refer to both first cardan shaft and the second cardan shaft if not otherwise expressed.

Figure 1:
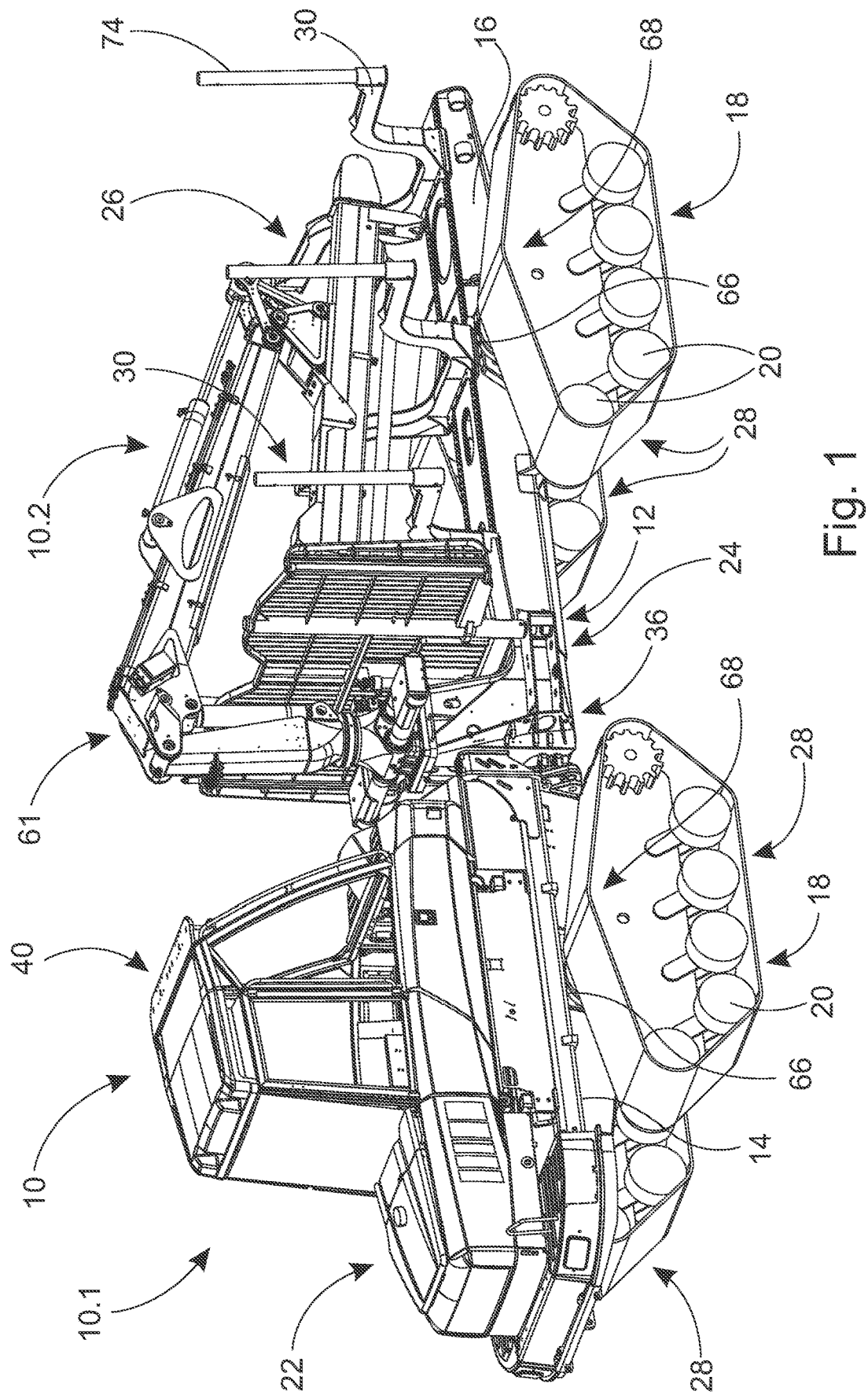
FIG. 1 shows a forest machine according to the prior art axonometrically at an angle from in front.

When referring to the forest machine according to the invention and the forest machine 10 of the prior art according to FIG. 1, the forest machine can be envisaged as comprising at least two part, i.e. a front part 13 and a rear part 15, of which the front part 13 is constructed around a first chassis 14 and the rear part 15 in turn around a second chassis 16. The first chassis 14 and the second chassis 16 are joined together with the aid of a central pivot. In the case of its front part 13, the forest machine 10 according to the invention can correspond completely to the forest machine, i.e. forwarder, according to the prior art, shown in FIG. 1. A forest machine 10 according to the invention can also include, like the forest machine 10 of the prior art of FIG. 1, a set of lifting booms 61. The set of lifting booms can include a grapple or other similar tool for working with the set of booms. The structural differences of the forest machine according to the invention, compared to the forest machine according to the prior art of FIG. 1, are limited to the rear part of the forest machine, i.e. more specifically to the second chassis, the sets of wheels attached to the second chassis, the load space, and the power transmission. The power transmission in the first chassis is namely a first power transmission part and the power transmission in the second chassis is namely a second power transmission part. The forest machine according to the invention can also be, instead of the forwarder shown in FIGS. 2-6A, 7, and 9, a harvester or other similar forest machine. The sets of wheels in the first chassis are namely first sets of wheels and the sets of wheels in the second chassis are namely second sets of wheels.

Figure 2:
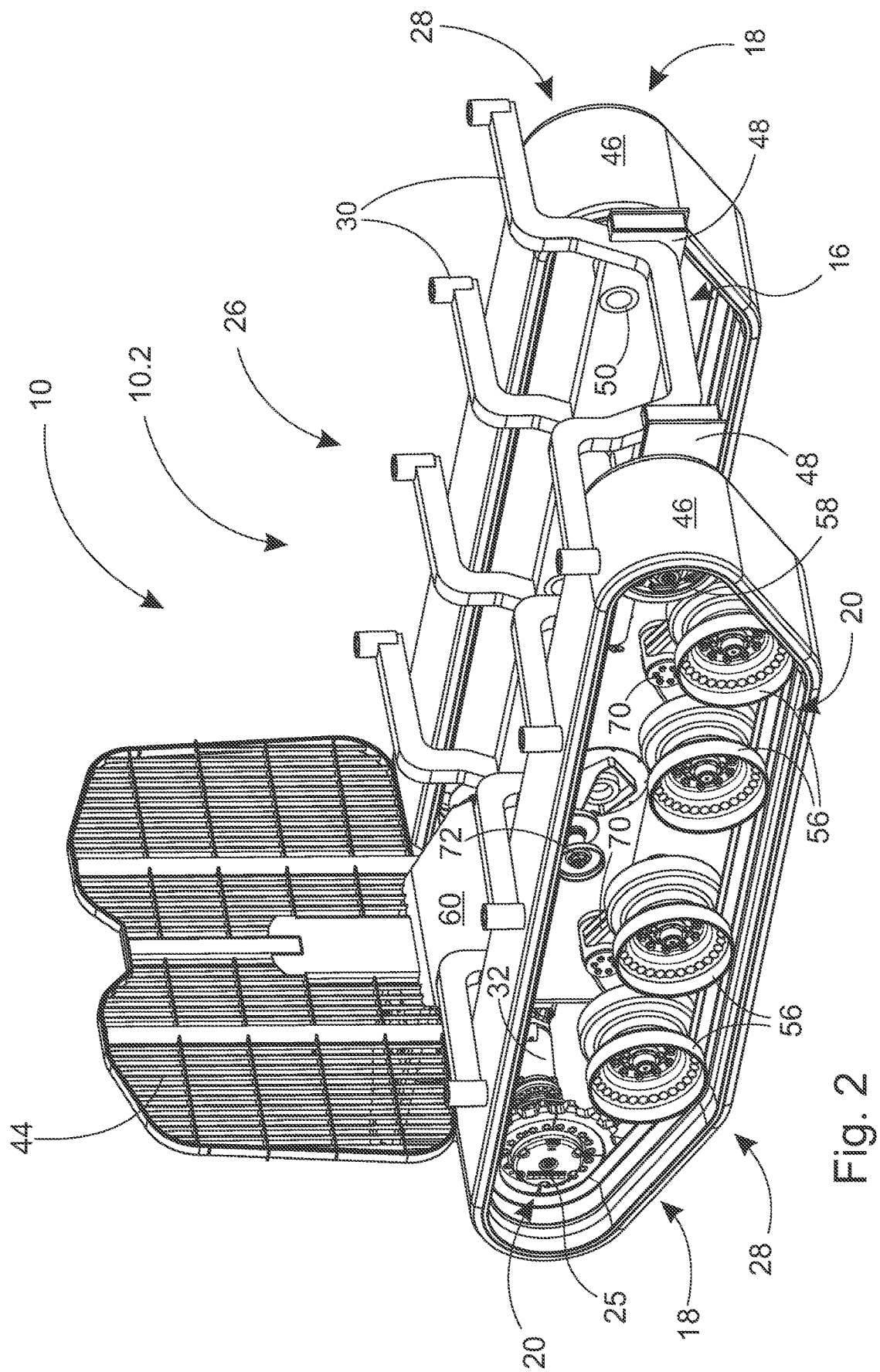
FIG. 2 shows the rear part of a forest machine according to the invention axonometrically at an angle from the rear.

FIG. 2 shows the rear part 15 of the forest machine 10 according to the invention, which is constructed around the second chassis 16. In FIG. 2, the rear part 15 is shown without the set of lifting booms, which is attached to the second chassis 16 in front of the load space 26 and the log gate 44. The greatest differences of the rear part 15 of the forest machine 10 according to the invention compared to the prior art can be seen from FIG. 2. The second chassis 16 is divided in two parts in such a way that the second chassis 16 is attached to the power transmission 24 in front of the load space 26 and divides into two longitudinal parts 48, which are at a distance from each other in the lateral direction of the forest machine 10. This distance corresponds to the width of the second chassis of forest machines in general use. The distance is generally 0.8-1.2 m. A second important aspect is that the sets of wheels 18 are attached directly permanently to the longitudinal parts 48, which at the same time also act as the frames of the set of wheels 18. With the aid of the power transmission located in front of the load space 26 power is distributed to the sets of wheels already before the load space 26, so that power transmission is not required over the distance of the load space. Because the power transmission under the load space 16 according to the prior art is eliminated and the second chassis 16 is divided into two parts in the forest machine according to the invention, in the forest machine according to the invention the load space 26 can be formed considerably lower than in forest machines of the prior art partly between the set of wheels 18 below the upper surface 43 of the longitudinal parts 48 of the second chassis 16. In this context the term permanent attachment of the sets of wheels 18 to the second chassis 16 refers to the fact that the wheels 20 of the set of wheels 18 are mounted in bearings directly on the second chassis without the use of separate shafts or bogie frames.

Figure 10:
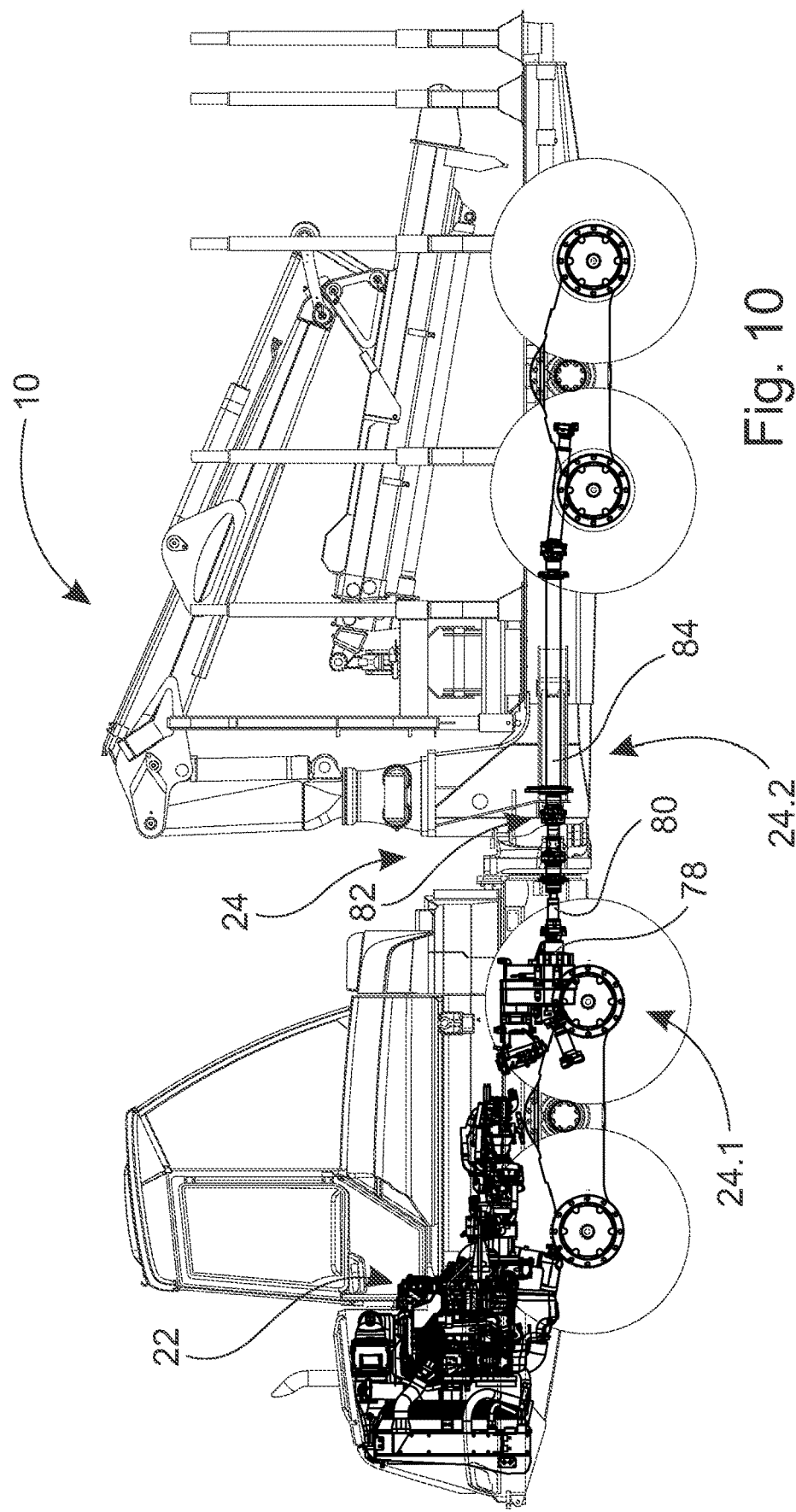
FIG. 10 shows side view of the power transmission of a forest machine according to the prior art.

FIG. 10 shows in greater detail the power transmission 24 of a forest machine according to the prior art, most of which can also be used in the forest machine according to the invention. The power transmission 24 is divided into the power transmission 23 of the first chassis 14 and the power transmission 27 of the second chassis 16, which are connected to each other at the central pivot 36. The power transmission 24 is connected from the power transmission 23 of the first chassis 14 to the engine 22 of the forest machine 10, which produces power. The power transmission 23 of the first chassis 14 includes a mechanical or hydraulic gearbox 78 and a first cardan shaft 80 connected to it. The first cardan shaft 80 transmits power at least as far as the central pivot 36, where the first cardan shaft 80 connects to the central pivot 82 of the cardan running through the central pivot. From the central pivot 82 of the cardan, power can be transmitted, with the aid of the second cardan shaft 84 belonging to the power transmission 27 of the second chassis 16 forwards to the sets of wheels 18. According to the invention, the cardan shaft 82 connects, unlike in FIG. 10, to a splitter, from where the power is transmitted with the aid of a differential to the drive wheel in the second chassis already before the load space. In other words, the second cardan shaft is, in the forest machine according to the invention, quite short, being only 0.5-1.5-m long.

Figure 3:
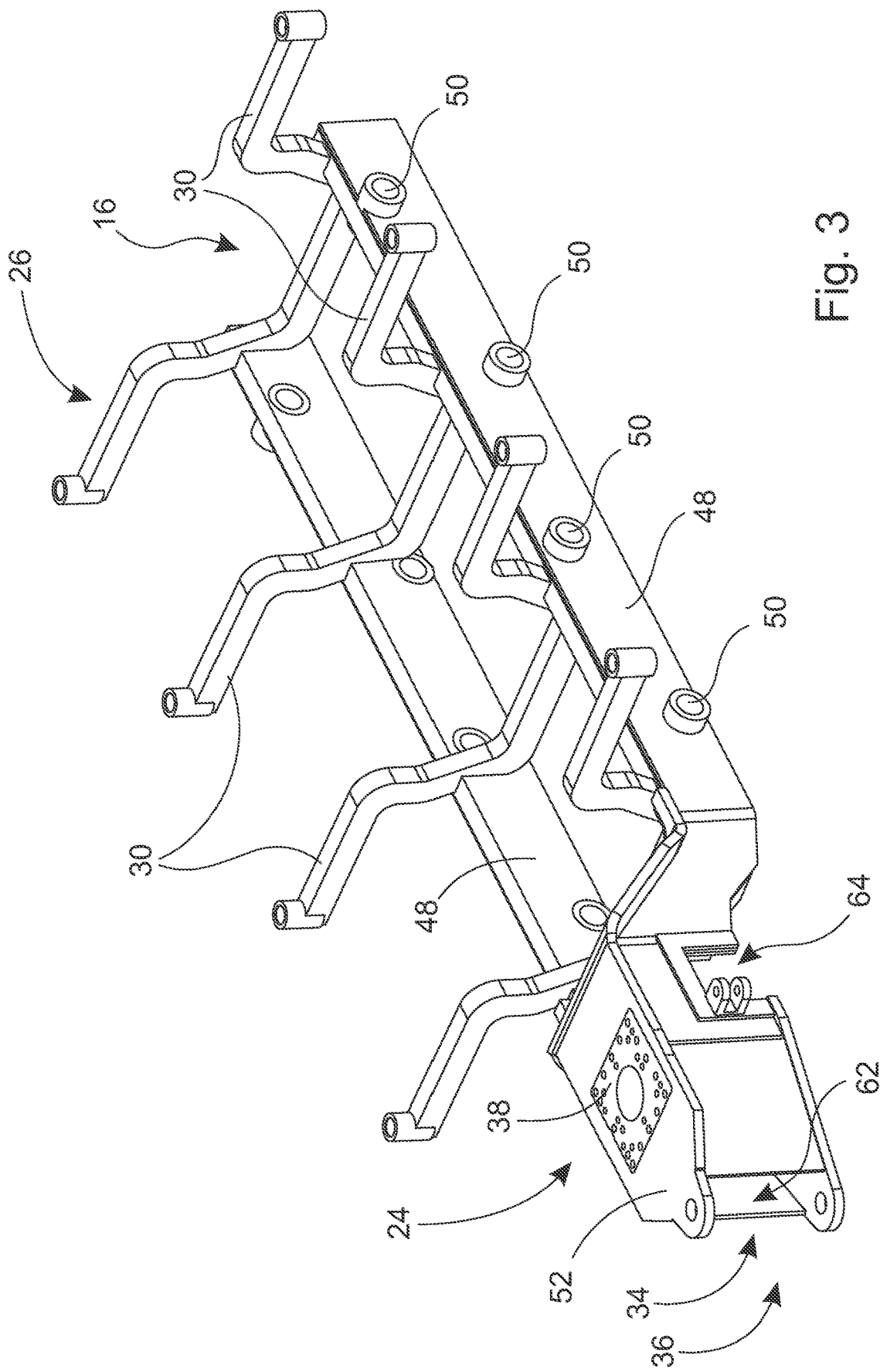
FIG. 3 shows the separated second chassis of a forest machine according to the invention shown axonometrically at an angle from in front.

FIG. 3 shows an axonometrical view of the second chassis 16 when separated. According to FIG. 3, the second chassis 16 is attached to the first chassis of the forest machine with the aid of a central pivot 36. The central pivot 36 can be, for example, a vertical pivot 34 equipped with a vertical shaft, which is formed in connection with the splitter 52 of the power transmission 24. The splitter 52 can also include an attachment base 38 for a set of lifting booms. An opening 62 in front is preferably formed in the splitter 52, through which the power transmission is brought from the first chassis to the splitter 52, for example, with the aid of a cardan shaft. Inside the splitter 52 can be, according to the prior art, brakes and a differential gear supported on the splitter 52, with the aid of which the power transmission is rotated to become lateral and is taken through a second opening 64 to the set of wheels. The splitter 52 is in turn attached to the longitudinal parts 48 of the second chassis 16, which run beneath the load space 26. Between the splitter 52 and the longitudinal parts 48 of the second chassis 16 is an angled intermediate piece 60, which sets the longitudinal parts 48 lower, bringing them to the correct height relative to the sets of wheels. The intermediate piece 60 can move the frame beams about 20-30-cm lower than the position of the splitter 52. In the embodiment shown in FIGS. 2-6A and 7, the second chassis 16 is made by welding the frame beams acting as the longitudinal parts 48 to the intermediate piece 60 in front of the load space 26. Alternatively, the second chassis can also be formed as a cast piece, in which the longitudinal parts are integrated.

According to FIG. 3, bearings 50 are attached to the longitudinal parts 48 for the wheels 20 of the set of wheels 18 of FIG. 2. More specifically, the bearings 50 are arranged for the lower wheels 56, crawler-track 46 support wheel 72 and idler 58 attached with the aid of the separate bogie frames 70 of FIG. 2. In the embodiment of FIG. 2, the drive wheel 25 is, for its part, preferably mounted in bearing directly to the rigid axle 32 of FIG. 7, which is in turn attached to the splitter 52. Inside the rigid axle power can be transmitted to the drive wheel 25. The flexibility against the ground of the set of wheels 18 is preferably achieved by the lower wheels 56, attached to the second chassis 16 with the aid of bogie frames 70, the attitude of which conforms to the ground.

According to FIGS. 3-5, the bunks 30 preferably forming the load space 26 can be welded as part of the second chassis 16, acting as stiffeners between the longitudinal parts 48 of the second chassis 16. In addition to, or instead of the bunks there can also be separate stiffener beams between the longitudinal parts of the second chassis. The bottom of the load space can also be formed, for example, of a single sheet-metal structure by bending or in other ways, but the bunks are the preferred form of implementation. In FIGS. 2-6A and 7, the bunks 30 are shown without the vertical pillars 74 attached to the ends of the bunks 30, which are shown in FIG. 1. The pillars 74 and bunks 30 together form the load space 26. According to FIGS. 3-5, the bunks 30 and the bottom of the load space 26 formed in that way preferably extends between the longitudinal parts 48 of the second chassis 16, whereas in constructions according to the prior art the bunks are attached to a plate on top of the second chassis. The bunks 30 can also be lower vertically than bunks of the prior art, because the sets of wheels 18 attached permanently to the longitudinal part 48 of the second chassis 16 do not swing, and thus do not need as much space vertically between the bunks 30 and the upper surface 42 of the set of wheels 18. In the embodiment of FIGS. 2-6A and 7, the upper surface 42 of the sets of wheels 18 is formed by the crawler track 46 of the crawler-track unit 28, which is fitted around the wheels 20 of the set of wheels 18 to form an endless loop.

Figure 6A:
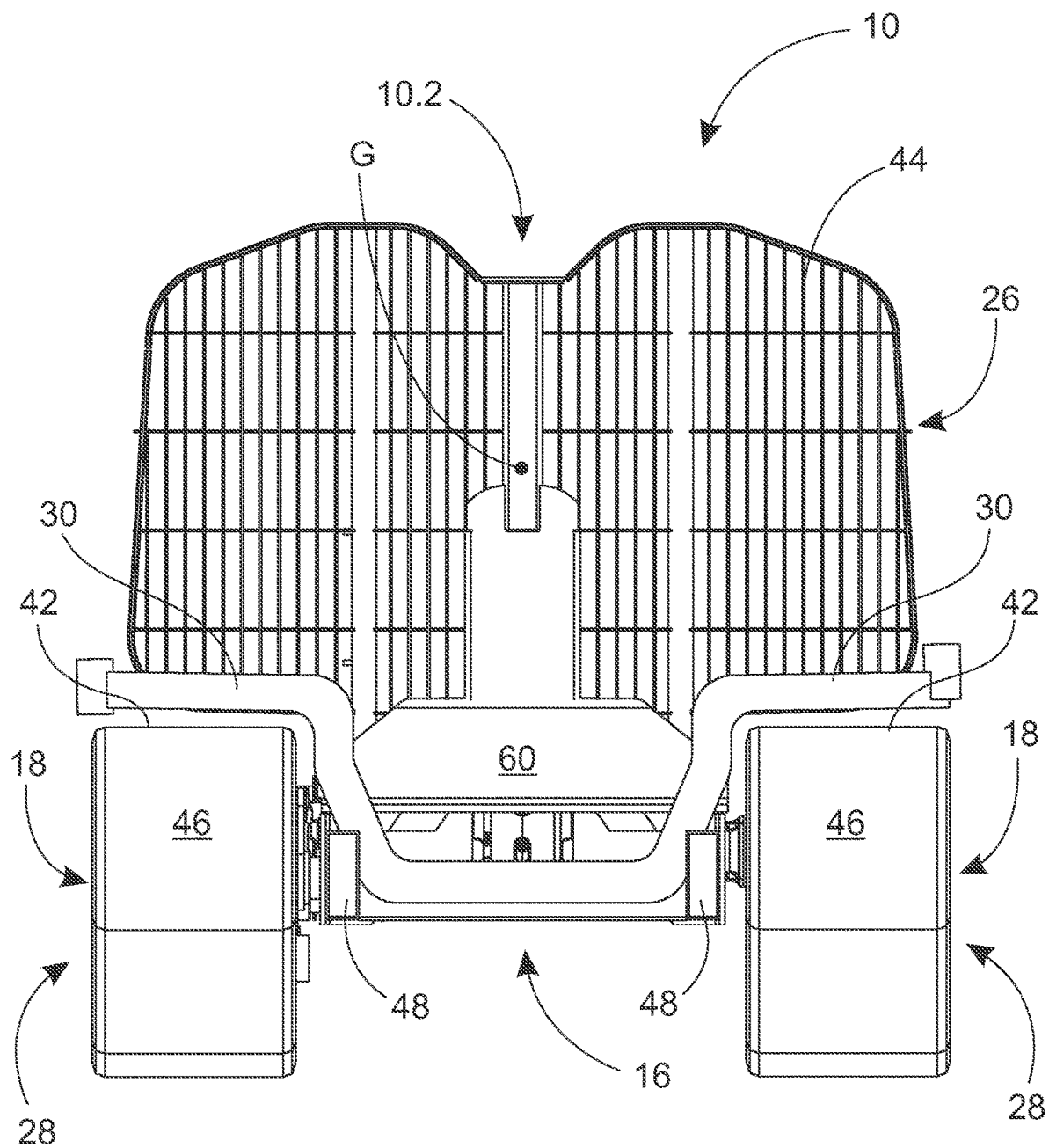
FIG. 6A shows a rear view of the rear part of the forest machine according to the invention.
Figure 6B:
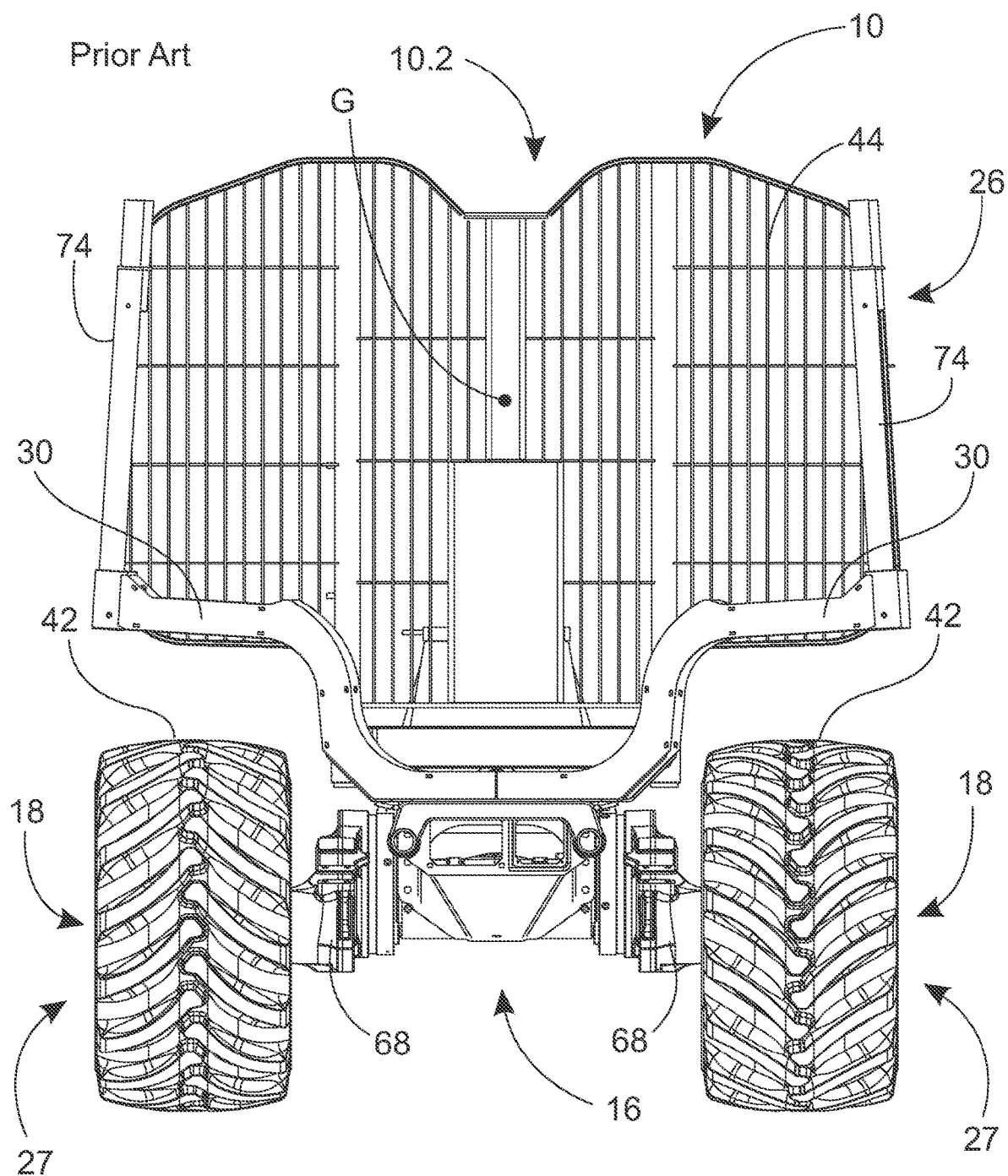
FIG. 6B shows a rear view of a forest machine equipped with bogie wheels according to the prior art.

FIG. 6A shows a rear view of the rear part 15 of the forest machine 10 according to the invention. According to FIG. 6A, the load space 26 extends between the sets of wheels 18 rigidly mounted on the second chassis 16, in this case the crawler-track units 28, below the undersurface 42 of the sets of wheels 18 and below the upper surface 43 of the longitudinal parts 48 of the second chassis 16. The load space 26 can extend between the sets of wheels 18 in the vertical direction for 30-60% of the height of the sets of wheels 18. In the embodiment of FIG. 6, this figure is about 45%. The part of the load space 26 extending on top of the sets of wheels 18 can be at a distance of 15-40 cm from the upper surface 42 of the sets of wheels 18, because the set of wheels 18 does not swing and therefore does not need empty space above it. In other words, the set of wheels is rigidly attached to the second chassis. The sets of wheels conform to the ground only through the swinging of the bogie frame of the lower wheels, but this movement does not alter the level of the upper edge of the set of wheels. FIG. 6A also shows the assumed centre point of the mass of the rear part 15 when the load space is full. If the forest machine of FIG. 6A according to the invention is compared to the forest machine of FIG. 6B according to the prior art, it will be seen that the centre point G of the mass is considerably lower in the forest machine according to the invention that the centre of gravity of the load of the forest machine according to the prior art. This reduces the lateral movement of the centre of gravity of the load when the forest machine tilts and the loading thus transfers to single set of wheels. FIG. 6A also shows the intermediate piece 60, to which the longitudinal parts 48 of the second chassis are attached. In the context of a forest machine, the lowering of the load space is particularly significant, because the load space can be up to 3 metres high.

Figure 7:
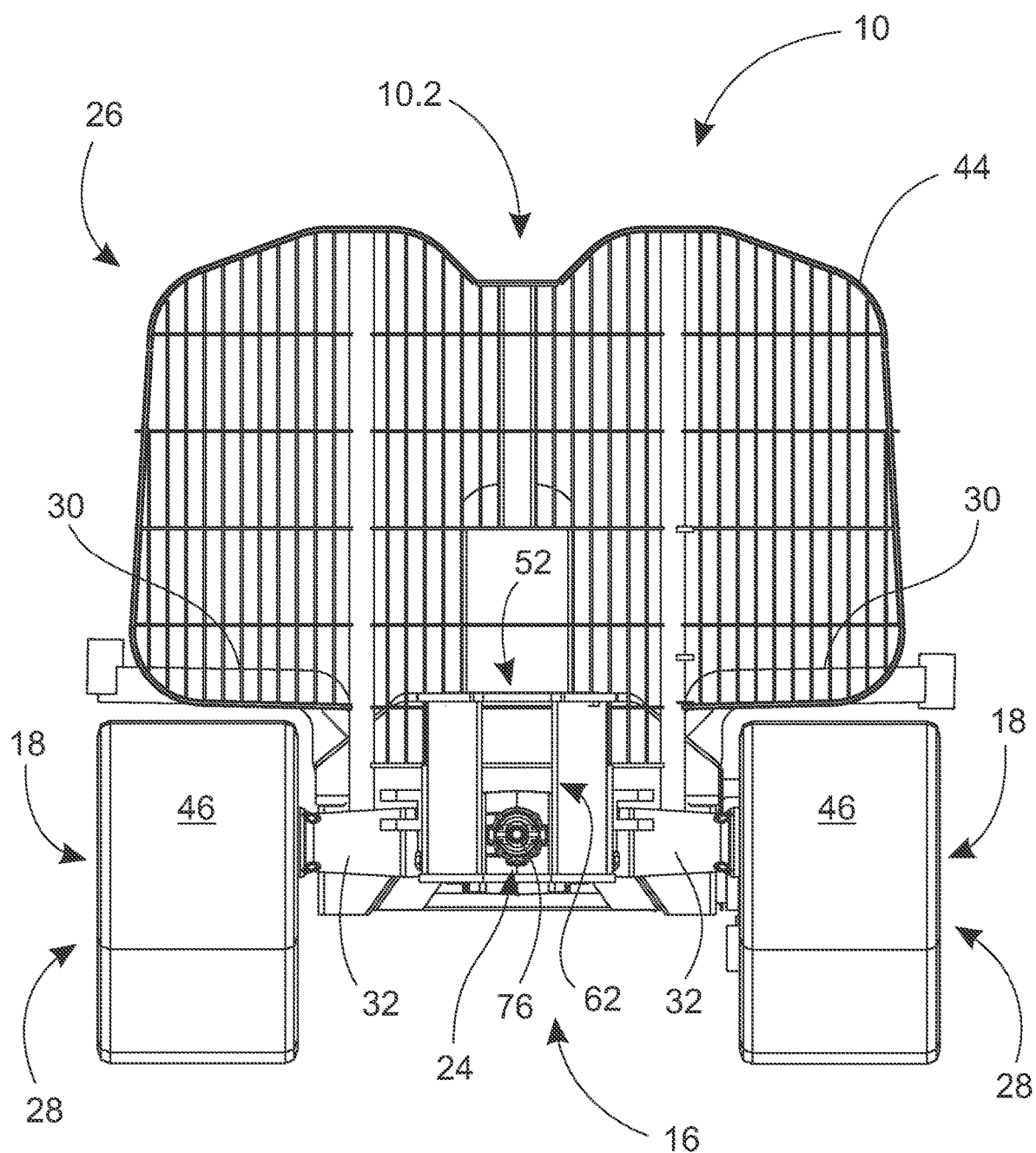
FIG. 7 shows a front view of the rear part of the forest machine according to the invention.
Figure 8:
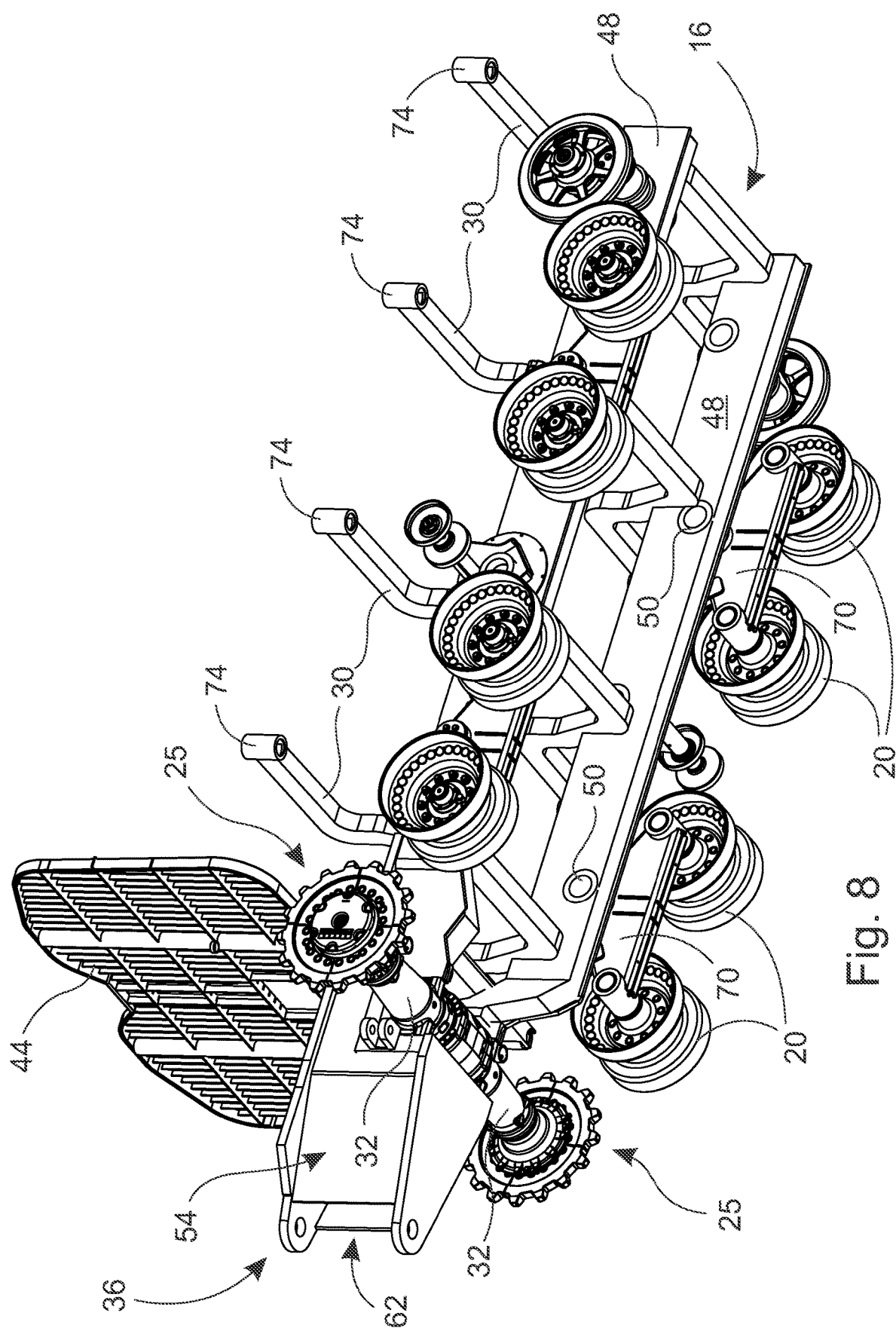
FIG. 8 shows axonometrically at an angle from below the forest machine according to the invention, seen without a crawler track.
Figure 9:
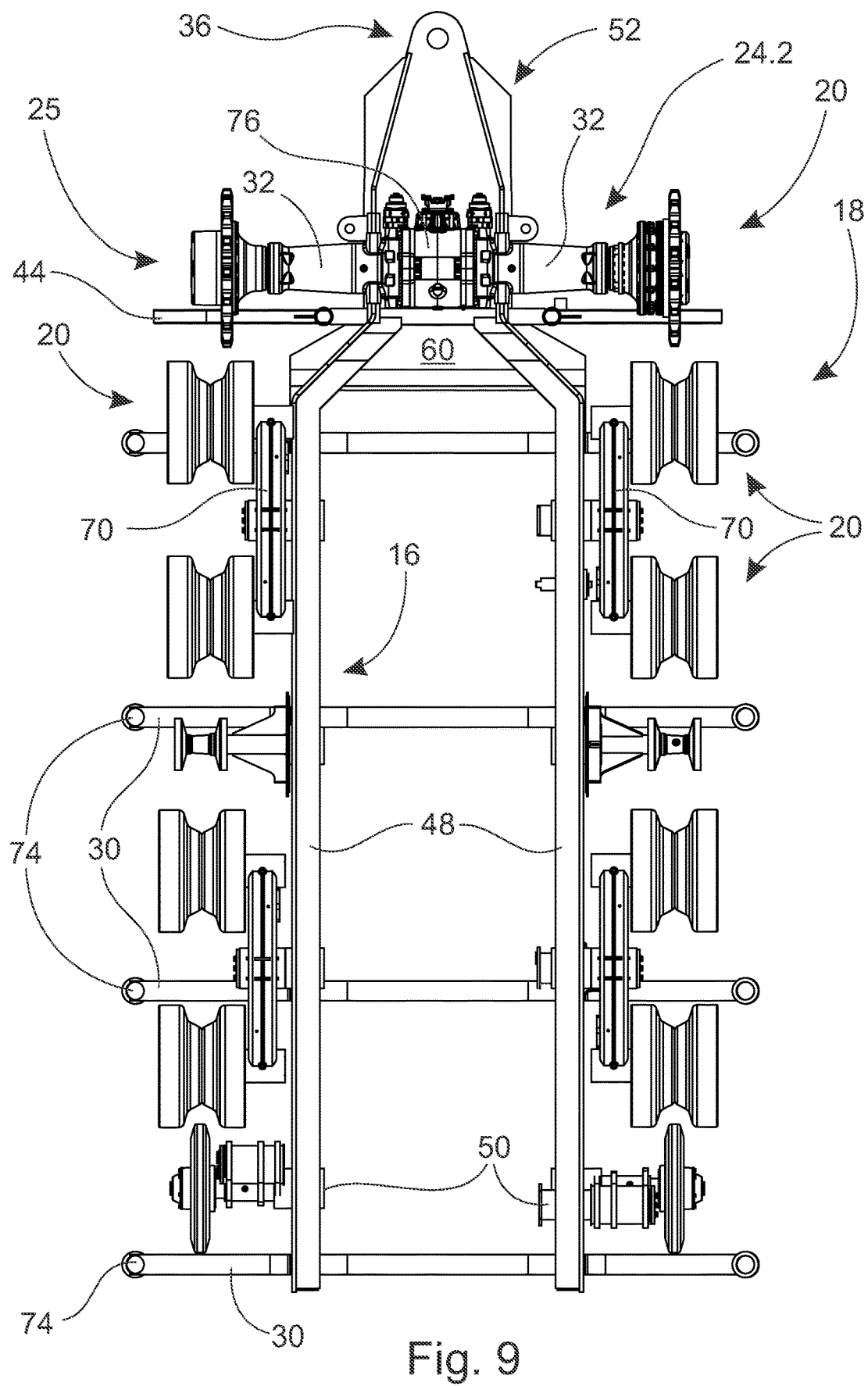
FIG. 9 shows a bottom view of the forest machine according to the invention, seen without the crawler track.

FIG. 7 shows a front view of the rear part 15 of the forest machine according to the invention. FIGS. 7-9 show the differential 76 of the transmission 24 inside the splitter 52. In addition, the figure shows how the preferably rigid axle 32 suspending the drive wheel 25 of the set of wheels 18 is attached to the side of the splitter 52. The rigid axle 32 can be hollow and inside it power can be transmitted to the drive wheel 25, for example mechanically, with the aid of a drive shaft. Alternatively, there can be a hub motor in connection with the drive wheel, which can be, for example, hydraulically operated, when the hydraulic flow is taken along hoses through the hollow axle, or electrical, when electric leads are taken through the rigid axle. In the forest machine according to the invention, the forces acting on the bearings of the wheels can be taken through the supports of all the wheels, and not only through a swing bogie as in a forest machine according to the prior art.

In the second chassis of the forest machine according to the invention the preferably used frame beams can be welded box structures or correspondingly strong angle irons.

Figure 11:
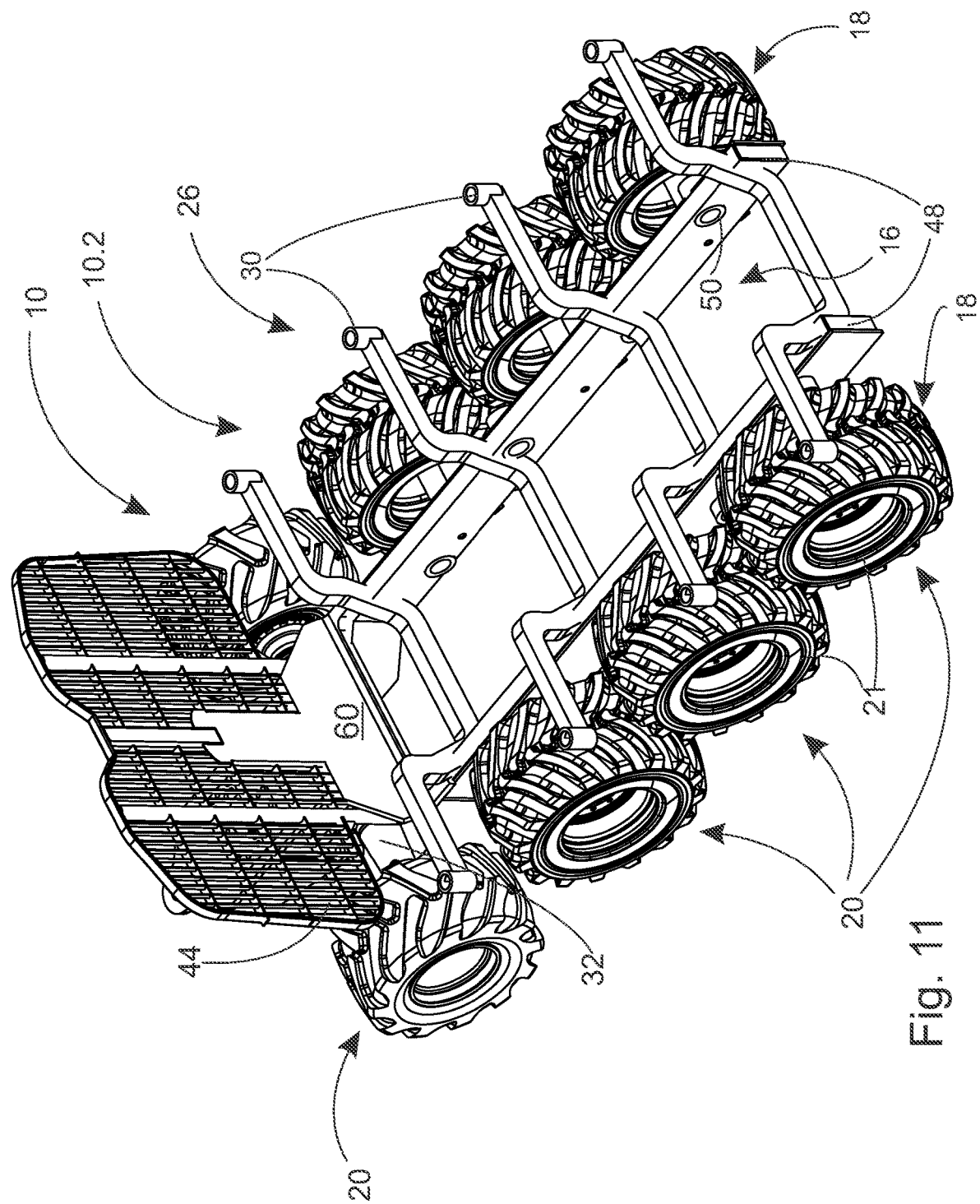
FIG. 11 shows axonometrically forest machine according to a second embodiment of the invention, in which a set of pneumatic wheels is used, seen from below.
Figure 12:
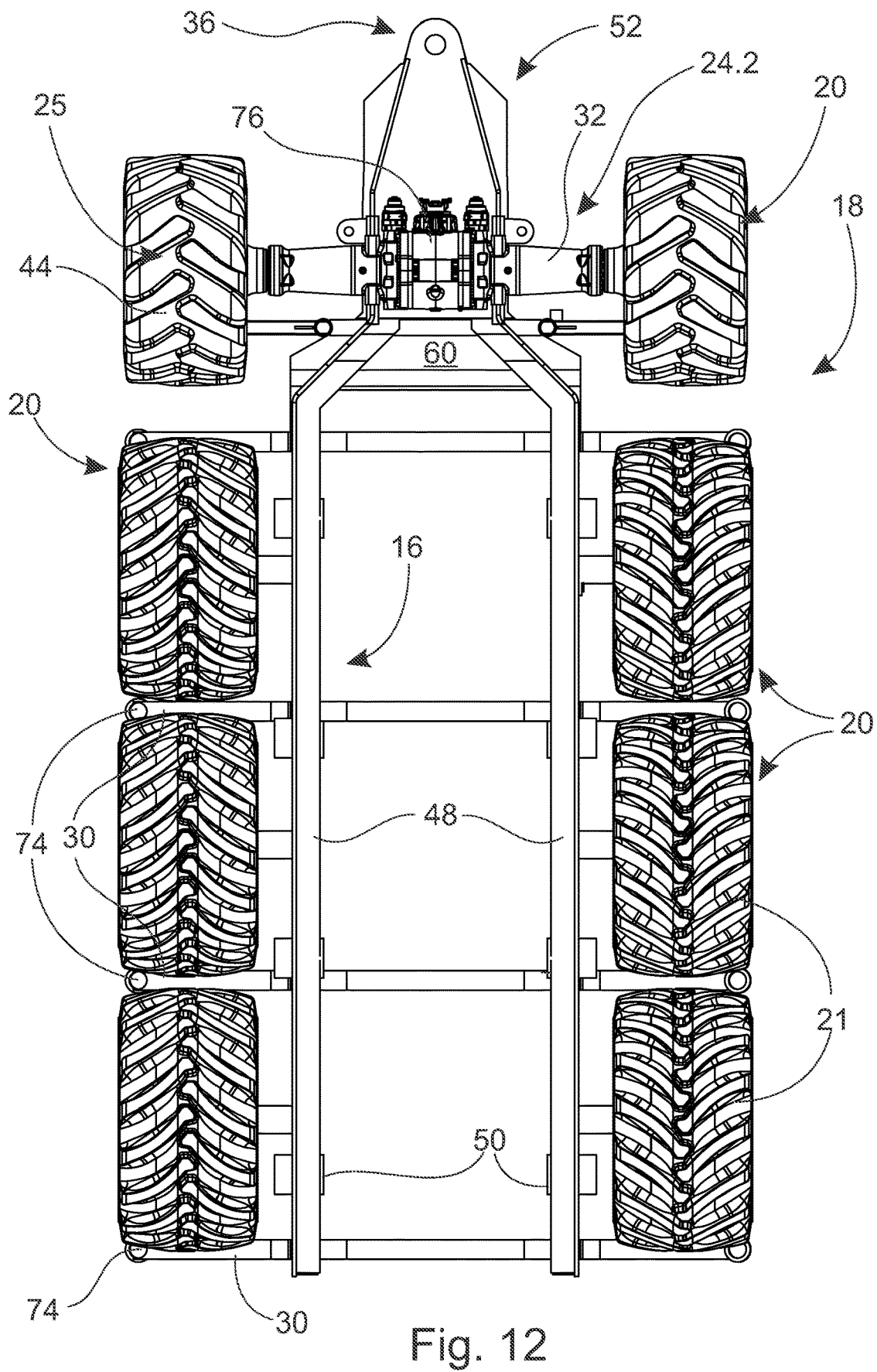
FIG. 12 shows a bottom view of a forest machine according to a second embodiment of the invention, in which a set of pneumatic wheels is used.

FIGS. 11 and 12 show a second embodiment of the forest machine 10 according to the invention, in which the sets of wheels 18 are sets of pneumatic wheels. The term set of pneumatic wheels refers to a set of wheels 18, in which a crawler track is preferably not used around the wheels, instead the wheels 20 are pneumatic wheels 21 in order to achieve sufficiently flexibility and thus the forest machine's low surface pressure. If a crawler track is used in a set of pneumatic wheels, the set of pneumatic wheels differs, however, from a set of crawler-track wheels in that the wheels of a set of crawler-track wheels are not pneumatic and are located taking into account a suitable angle of contact of the track circulation.

The rear part of the forest machine according to the invention is 6-12-m, preferably 8-10-m long, 2-3-m wide, and 3-5-m high. The second chassis is preferably 60-100-cm wide. The outer diameter of the swing bearing used can be 40-65 cm. The crawler-track unit used in the forest machine according to the invention can be, for example, the crawler-track units Panther T8, Panther T12, or Panther T12-2 manufactured by the Italian-Canadian Prinoth AG.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. Forest machine, comprising:
a chassis having a first chassis and a second chassis pivoted consecutively by a central pivot,
a first sets of wheels arranged in connection with the first chassis on both sides of the first chassis supporting the first chassis of the forest machine on ground, each first set of wheels including at least two wheels at a distance from each other in longitudinal direction of the first chassis, and at least one wheel of the at least two wheels of the first set of wheels is a first drive wheel,
a second sets of wheels arranged in connection with the second chassis on both sides of the second chassis supporting the second chassis of the forest machine on ground, each second set of wheels including at least two wheels at a distance from each other in longitudinal direction of the second chassis, and at least one wheel of the at least two wheels of the second set of wheels is a second drive wheel installed in the second chassis in a fixed position relative to longitudinal length of the second chassis,
an engine creating drive power, fitted in connection with the first chassis,
a load space for transporting a load, supported on the second chassis and extending at least mainly on top of the second chassis and at least partly on top of the second sets of wheels in an operating position of the forest machine, which load space extends at least partly below an upper surface of the second sets of wheels between the second sets of wheels lowering centre of gravity of the forest machine,
power transmission transmitting power from the engine to the second sets of wheels of the second chassis, comprising a first power transmission part located in the first chassis and a second power transmission part arranged in the second chassis in front of the load space in direction of travel of the forest machine, between the central pivot and the load space, in which the first power transmission part transmits power to the second power transmission part, which further transmits power to the second drive wheel of the second sets of wheels, wherein the second chassis
includes two longitudinal parts attached to each other at least in front of the load space, which longitudinal parts are at a distance from each other in lateral direction of the forest machine at least over a partial length of the load space, in which forest machine the load space extends between the longitudinal parts in vertical direction of the forest machine.

2. The forest machine according to claim 1, wherein the load space extends below an undersurface of an upper surface of the longitudinal parts of the second chassis.

3. The forest machine according to claim 1, wherein the first sets of wheels and the second sets of wheels are each part of a crawler-track unit.

4. The forest machine according to claim 1, wherein the first sets of wheels and the second sets of wheels are each part of a set of pneumatic wheels.

5. The forest machine according to claim 1, wherein the second chassis forms a part of second sets of wheels, and the second sets wheels are mounted in bearings directly on the second chassis.

6. The forest machine according to claim 1, wherein the second power transmission part includes a rigid axle on the second chassis for supporting the second drive wheel of each second set of wheels on the second chassis for transmitting drive directly to the second drive wheel of each second set of wheels.

7. The forest machine according to claim 1, wherein the load space extends between the second sets of wheels in the vertical direction of the second sets of wheels for 30-60% of height of the second sets of wheels.

8. The forest machine according to claim 1, wherein the second chassis includes a splitter comprising the central pivot for pivoting the second chassis to the first chassis.

9. The forest machine according to claim 8, wherein the second chassis includes an intermediate piece for attaching the longitudinal parts of the second chassis to each other and to the splitter.

10. The forest machine according to claim 1, wherein the longitudinal parts are frame beams.

11. The forest machine according to claim 1, wherein the second chassis is a cast piece and includes the longitudinal parts as parts integrated in the cast piece, which are joined together at least in front of the load space with the cast piece.

12. The forest machine according to claim 1, comprising a first cardan shaft of the first power transmission part for transmitting power in the first chassis, a second cardan shaft of the second power transmission part and a cardan central pivot fitted to the central pivot between the first cardan shaft and the second cardan shaft, which cardan central picot acts as the pivot component.

13. The forest machine according to claim 12, wherein the second cardan shaft is arranged to transmit power to the splitter and is 0.5-1.5-m long.

14. The forest machine according to claim 1, wherein at least two wheels of each set second of wheels, which are freely rotating, are supported to swing on the second chassis with the aid of separate bogie frames.

15. The forest machine according to claim 1, wherein the second sets of wheels include a wheel-set frame and the longitudinal parts of the second chassis are arranged to form the wheel-set frame of each second set of wheels, on which wheel-set frame at least some of the wheels of each second set of wheels are mounted in bearings.

16. The forest machine according to claim 14, wherein the bogie frame is curved in shape.

17. The forest machine according to claim 1, wherein in each second set of wheels the second drive wheel is first in the direction of travel of the forest machine, so that power is transmitted to the second drive wheel before the load space.

18. The forest machine according to claim 1, wherein each first set of wheels and second set of wheels is symmetrical in terms of placing of the wheels in both driving directions of the forest machine.

19. The forest machine according to claim 1, wherein each second set of wheels of the second chassis also includes an idler and at least one support wheel, both of which are installed in the second chassis in a fixed position relative to the longitudinal direction of the second chassis.

20. The forest machine according to claim 14, wherein the swing bogie is arranged to turn through a range of movement of at most 90°.

\* \* \* \* \*